(12) United States Patent
Wilson et al.

(10) Patent No.: US 11,655,104 B2
(45) Date of Patent: May 23, 2023

(54) DEFLECTOR FOR HIGH ANGLE CONVEYOR PRESSING ASSEMBLY

(71) Applicant: Joy Global Conveyors Inc, Winfield, AL (US)

(72) Inventors: Gavin Wilson, Whitley Bay (GB); Stevie Kim Nix, Winfield, AL (US)

(73) Assignee: CONTINENTAL GLOBAL MATERIAL HANDLING LLC, Somersby (AU)

( * ) Notice: Subject to any disclaimer, the term of this patent is extended or adjusted under 35 U.S.C. 154(b) by 204 days.

(21) Appl. No.: 17/323,633

(22) Filed: May 18, 2021

(65) Prior Publication Data

US 2021/0269247 A1    Sep. 2, 2021

Related U.S. Application Data (62) Division of application No. 16/512,765, filed on Jul. 16, 2019, now Pat. No. 11,008,171.

(60) Provisional application No. 62/698,609, filed on Jul. 16, 2018.

(51) Int. Cl.
*B65G 15/14* (2006.01)
*B65G 15/16* (2006.01)

(52) U.S. Cl.
CPC .......... *B65G 15/16* (2013.01); *B65G 2201/04* (2013.01)

(58) Field of Classification Search
None
See application file for complete search history.

(56) References Cited

U.S. PATENT DOCUMENTS

| | | | | | |
|---|---|---|---|---|---|
| 2,257,351 | A | * | 9/1941 | Silver | B65G 37/00 198/550.4 |
| 2,619,221 | A | * | 11/1952 | Madeira | B65G 39/14 198/825 |
| 2,695,701 | A | * | 11/1954 | Hagenbook | B65G 39/14 198/826 |
| 2,966,254 | A | * | 12/1960 | Kaiser | B65G 37/00 198/801 |
| 3,262,545 | A | * | 7/1966 | Worsencroft | B65H 5/023 198/626.6 |

(Continued)

FOREIGN PATENT DOCUMENTS

| CN | 38100575 A | 8/1988 |
|---|---|---|
| CN | 1042879 A | 6/1990 |

(Continued)

OTHER PUBLICATIONS

C-KIT, "Sandwich Conveyors—Functional Description", <http://www.ckit.co.za/secure/conveyor/sandwich/sandwich_basics_funcdescript.html>, 2015, 3 pages.

(Continued)

*Primary Examiner* — Joseph A Dillon, Jr.
(74) *Attorney, Agent, or Firm* — Bradley Arant Boult Cummings LLP; Jonathan Wohlwend; Ashley M. Robinson (57) ABSTRACT

A pressing assembly for a conveyor having a first conveyor belt and a second conveyor belt includes a roller support, a linkage coupled to the roller support, a roller rotatably coupled to the linkage, the roller configured to engage the first conveyor belt to press the first conveyor belt toward the second conveyor belt, and a deflector engageable with the first conveyor belt to inhibit contact between the first conveyor belt and the linkage.

20 Claims, 12 Drawing Sheets

(56) References Cited

U.S. PATENT DOCUMENTS

| | | | |
|---|---|---|---|
| 3,682,294 A | 8/1972 | Milek | |
| 3,951,257 A * | 4/1976 | Storace | B65H 5/023 |
| | | | 198/626.6 |
| 4,099,712 A | 7/1978 | Martin | |
| 4,195,724 A * | 4/1980 | Janitsch | B65G 15/14 |
| | | | 198/626.2 |
| 4,214,744 A | 7/1980 | Evans | |
| 4,433,774 A | 2/1984 | Lopes | |
| 4,457,422 A | 7/1984 | Hurd | |
| 4,561,537 A | 12/1985 | Dos Santos | |
| 4,564,189 A | 1/1986 | Noll, Jr. | |
| 4,565,281 A | 1/1986 | Kramer | |
| 4,566,586 A | 1/1986 | Robertson | |
| 4,609,097 A | 9/1986 | Dos Santos | |
| 4,732,267 A | 3/1988 | Schober | |
| 4,982,835 A | 1/1991 | Butler et al. | |
| 5,165,314 A | 11/1992 | Paulson et al. | |
| 5,186,310 A | 2/1993 | Winchester | |
| 5,193,423 A | 3/1993 | Bakker | |
| 5,320,471 A | 6/1994 | Grathof | |
| 5,435,433 A | 7/1995 | Jordan et al. | |
| 5,875,697 A | 3/1999 | Cole et al. | |
| 6,264,022 B1 | 7/2001 | Petack et al. | |
| 6,484,870 B2 | 11/2002 | Bohnker et al. | |
| 6,626,283 B2 | 9/2003 | McBride | |
| 6,793,454 B2 | 9/2004 | Brizzi | |
| 7,000,759 B1 | 2/2006 | Jones | |
| 7,464,808 B2 * | 12/2008 | Bohnker | B65G 15/16 |
| | | | 198/626.5 |
| 8,910,778 B1 | 12/2014 | Francisco et al. | |
| 9,873,566 B2 * | 1/2018 | De Lore | B65G 23/36 |
| 9,884,729 B1 | 2/2018 | Nix | |
| 10,071,860 B2 | 9/2018 | Kahrger et al. | |
| 10,155,624 B1 | 12/2018 | Nix | |
| 10,894,665 B2 * | 1/2021 | Wilson | F16F 1/121 |
| 11,117,751 B2 * | 9/2021 | Wheeler | B65G 41/006 |
| 11,148,885 B1 * | 10/2021 | Dos Santos | B65G 21/14 |
| 11,440,053 B1 * | 9/2022 | Rocksvold | B07B 11/06 |
| 11,485,580 B2 * | 11/2022 | Dos Santos | E21F 13/04 |

| | | | |
|---|---|---|---|
| 2002/0121425 A1 * | 9/2002 | McBride | B65H 29/12 |
| | | | 198/469.1 |
| 2003/0047424 A1 | 3/2003 | Monahan et al. | |
| 2003/0192776 A1 | 10/2003 | Sousek et al. | |
| 2006/0108206 A1 | 5/2006 | Kotaki et al. | |
| 2009/0166159 A1 | 7/2009 | Murayama | |
| 2014/0311868 A1 | 10/2014 | Pribyl | |
| 2015/0075207 A1 | 3/2015 | Karikusa et al. | |
| 2016/0083188 A1 | 3/2016 | Pribyl | |
| 2017/0225899 A1 | 8/2017 | Smith | |
| 2017/0362040 A1 | 12/2017 | Wetters et al. | |
| 2020/0071081 A1 | 3/2020 | Wilson et al. | |

FOREIGN PATENT DOCUMENTS

| | | | | |
|---|---|---|---|---|
| CN | 203581795 U | | 5/2014 | |
| CN | 203767461 U | | 8/2014 | |
| CN | 107777280 A | | 3/2018 | |
| CN | 113830491 A | * | 12/2021 | |
| GB | 331567 A | | 3/1960 | |
| GB | 345444 A | | 1/1964 | |
| GB | 2036681 A | * | 7/1980 | B65G 15/14 |
| JP | 54971693 U | | 7/1974 | |
| JP | S60148805 A | | 8/1985 | |
| JP | 56144046 U | | 3/1986 | |
| SU | 491550 A1 | | 11/1975 | |
| WO | 2007131692 A1 | | 11/2007 | |

OTHER PUBLICATIONS

Conveyor, "Spring Tension Support on Conveyor Belt: How to Build a Conveyor Belt, How to Make a Mini Conveyor Belt, How to Make a", <http://www.wcre.us/conveyor_plant/3314.html>, 2015, 9 pages.

Dos Santos et al., "Open-Pit Mining: Evolution of Sandwich Belt High-Angle Conveyors", Papers: Evolution of a Sandwich Belt, <http://www.ckit.co.za/secure/conveyor/papers/sandwich/evolution/evolution.html>, 2015, 22 pages.

Joy Global, "HAC System—High Angle Conveyor Product Overview", HAC System Product Overview Brochure, 2015, 3 pages.

* cited by examiner

DEFLECTOR FOR HIGH ANGLE CONVEYOR PRESSING ASSEMBLY

CROSS-REFERENCE TO RELATED APPLICATIONS

This application is a divisional of U.S. patent application Ser. No. 16/512,765, filed Jul. 16, 2019, now U.S. Pat. No. 11,008,171, which claims priority to U.S. Provisional Patent Application No. 62/698,609, filed on Jul. 16, 2018, the entire content of which is incorporated herein by reference.

BACKGROUND

The present disclosure relates to high angle conveyors and more specifically, to pressing assemblies for high angle conveyors.

SUMMARY

In one aspect, the disclosure provides a high angle conveyor including a frame, a first conveyor belt, a second conveyor belt, and a pressing assembly configured to press the first conveyor belt toward the second conveyor belt. The pressing assembly includes a bracket pivotally coupled to the frame, a roller support pivotally coupled to the bracket at a pivot joint, a plurality of rollers coupled to the roller support, the plurality of rollers configured to engage the first conveyor belt, and a deflector configured to inhibit contact between the first conveyor belt and the pivot joint.

In some embodiments, the plurality of rollers includes a first roller and a second roller, and in some embodiments the pivot joint is positioned between the first roller and the second roller.

In some embodiments, the pressing assembly includes a plurality of linkages rotatably supporting the plurality of rollers, and in some embodiments, the deflector is configured to inhibit contact between the first conveyor belt and each of the plurality of linkages.

In some embodiments, the high angle conveyor includes a spring configured to bias the plurality of rollers into engagement with the first conveyor belt.

In some embodiments, the deflector includes a deflector roller support extending from the roller support toward the first conveyor belt and a deflector roller rotatably coupled to the deflector roller support.

In some embodiments, the deflector includes a plurality of deflector roller supports extending from the roller support toward the first conveyor belt and a plurality of deflector rollers, each deflector roller of the plurality of deflector rollers rotatably coupled to a respective deflector roller support of the plurality of deflector roller supports.

In some embodiments, the deflector includes a curved plate.

In some embodiments, the curved plate is made of metal.

In some embodiments, the curved plate is made of ultra-high molecular weight polyethylene.

In some embodiments, the curved plate at least partially surrounds the pivot joint.

In some embodiments, the deflector includes a plurality of sliding blocks made of a low friction material.

In some embodiments, the deflector is configured to engage the first conveyor belt in response to a lump of material being conveyed past the pressing assembly.

The disclosure provides, in another aspect, a pressing assembly for a conveyor having a first conveyor belt and a second conveyor belt. The pressing assembly includes a roller support, a linkage coupled to the roller support, a roller rotatably coupled to the linkage, the roller configured to engage the first conveyor belt to press the first conveyor belt toward the second conveyor belt, and a deflector engageable with the first conveyor belt to inhibit contact between the first conveyor belt and the linkage.

In some embodiments, the deflector includes a curved plate coupled to the roller support.

In some embodiments, the deflector includes a deflector roller.

In some embodiments, the first conveyor is slidable along the deflector to inhibit contact between the first conveyor belt and the linkage.

In some embodiments, the deflector is made of a low friction material.

In some embodiments, the deflector is removably coupled to the roller support.

The disclosure provides, in another aspect, a conveyor including a frame, a first conveyor belt, a second conveyor belt, and a pressing assembly configured to press the first conveyor belt toward the second conveyor belt. The pressing assembly includes a bracket pivotally coupled to the frame, a roller support pivotally coupled to the bracket at a pivot joint, a linkage coupled to the roller support, a roller coupled to the linkage, the roller configured to engage the first conveyor belt, and a deflector configured to inhibit the first conveyor belt from contacting the linkage and the pivot joint when a lump of material is conveyed past the pressing assembly.

In some embodiments, the deflector is positioned between the pivot joint and the linkage.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
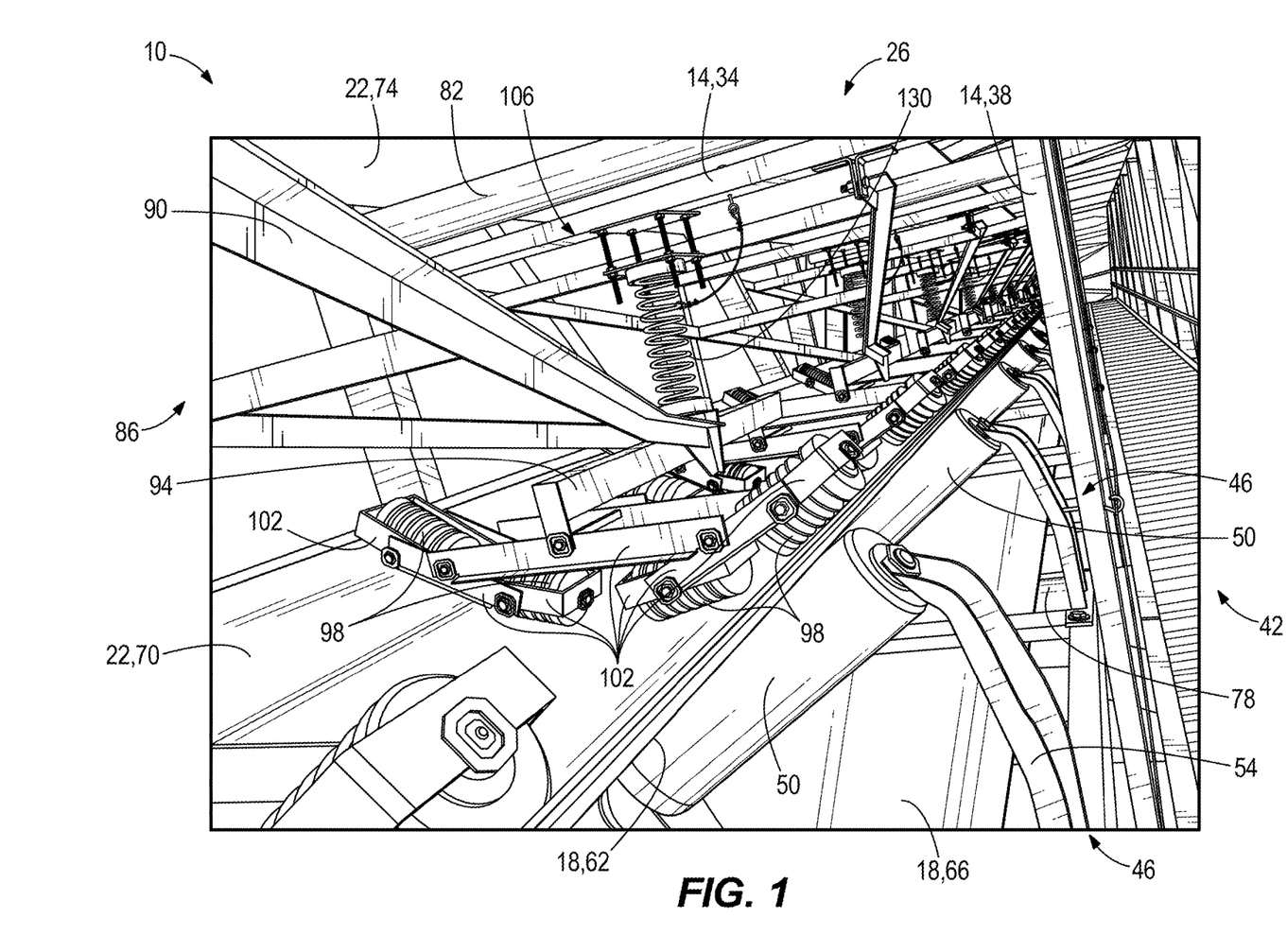
FIG. 1 is a perspective view of an exemplary high angle conveyor including pressing assemblies.

With reference to FIG. 1, a prior art high angle conveyor 10 is illustrated having a frame 14, a lower continuous conveyor belt 18, an upper continuous conveyor belt 22, and pressing assemblies 26. The lower conveyor belt 18 and the upper conveyor belt 22 are arranged in an endless sandwich configuration to conveyor material 30 (FIG. 3) between the lower and upper conveyor belts 18, 22 at large angles with respect to horizontal. For example, the high angle conveyor 10 may transport material 30 at a steep conveying angle up to 90° vertical.

Figure 2:
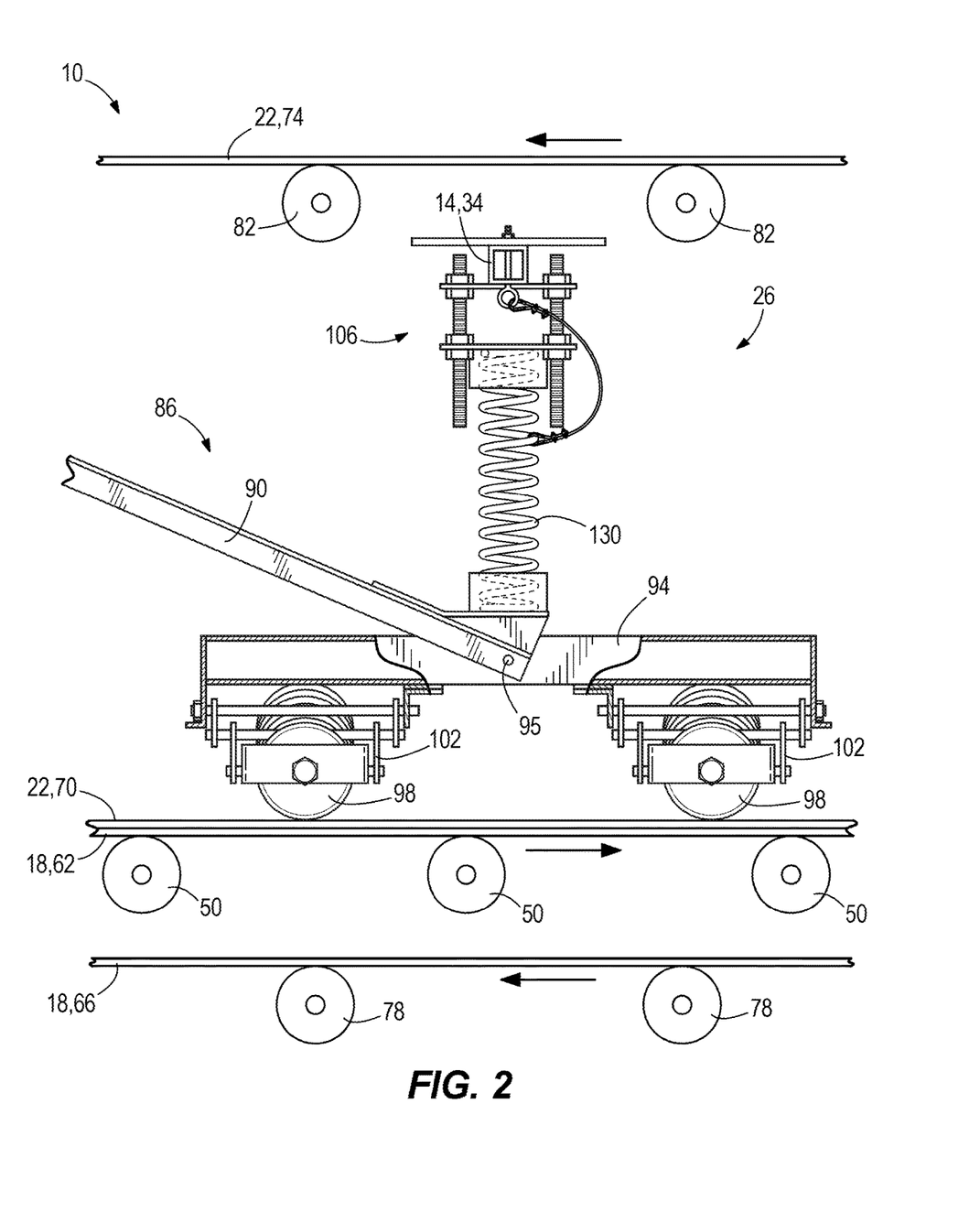
FIG. 2 is a side schematic view of one of the pressing assemblies of FIG. 1.
Figure 3:
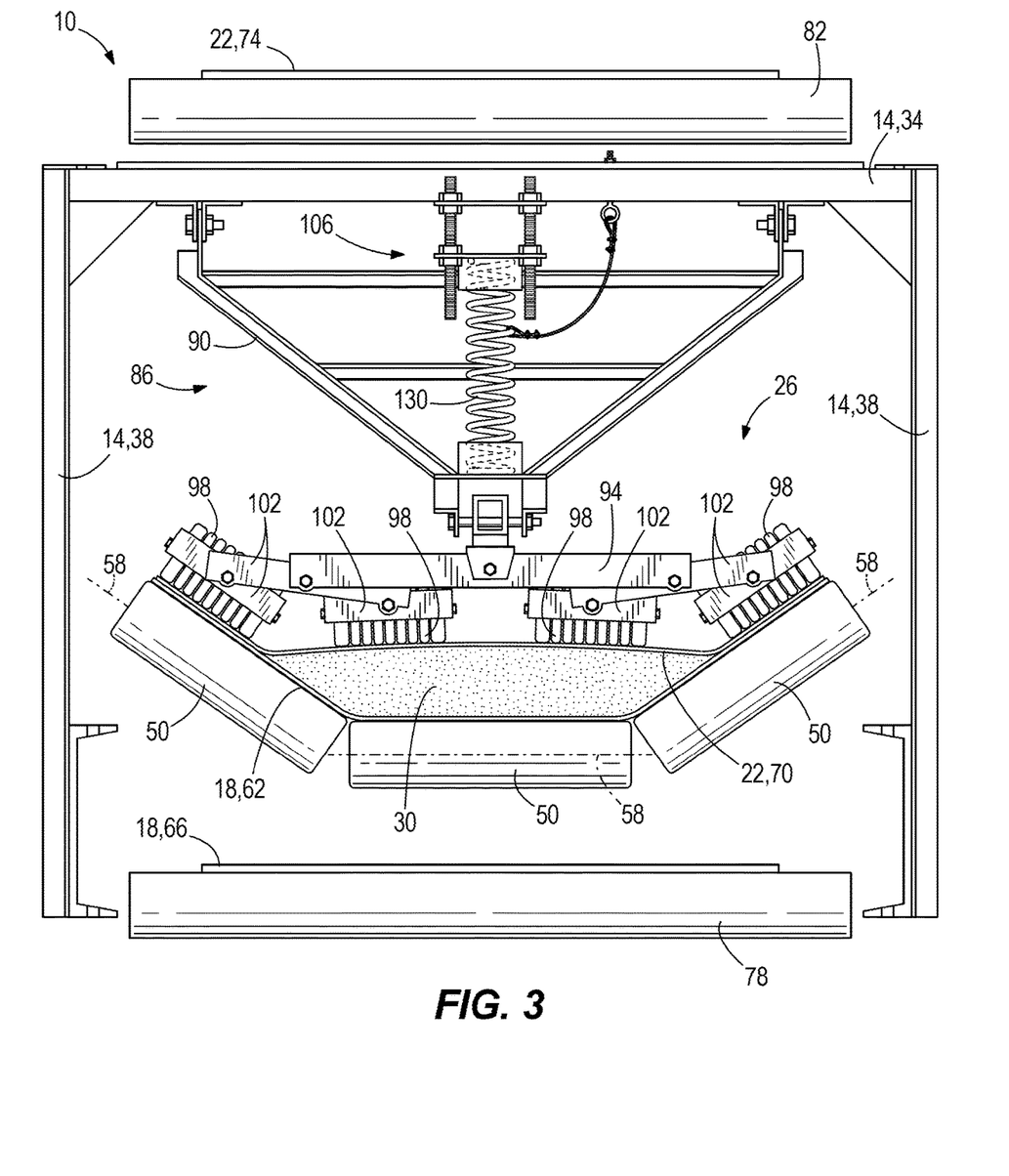
FIG. 3 is an end schematic view of one of the pressing assemblies of FIG. 1.

With reference to FIGS. 1-3, the frame 14 of the high angle conveyor 10 extends at an angle with respect to horizontal and includes top frame members 34 and side frame members 38. In some embodiments, the frame 14 may include a staircase 42 that ascends alongside the lower and upper conveyor belts 18, 22. Idler roller assemblies 46 are positioned beneath the lower conveyor belt 18. The idler roller assemblies 46 each include idler rollers 50 that are rotatable supported on an idler frame 54. In the illustrated embodiment, the idler rollers 50 in each idler roller assembly 46 are positioned such that the rotational axes 58 (FIG. 3) of the idler rollers 50 are not aligned (e.g., the idler rollers 50 may rotate about axes 58 that are transverse to each other). Such an arrangement of the idler rollers 50 forms a trough shape into which the material 30 is received between the lower and upper conveyor belts 18, 22 (FIG. 3).

With reference to FIG. 2, both the lower conveyor belt 18 and the upper conveyor belt 22 are continuous conveyor belts. Specifically, the lower conveyor belt 18 includes a lower conveying belt portion 62 and a lower return belt portion 66, and the upper conveyor belt 22 includes an upper conveying belt portion 70 and an upper return belt portion 74. The lower return belt portion 66 is supported by lower belt support rollers 78. The upper return belt portion 74 is supported by upper belt support rollers 82 coupled to the frame 14.

With continued reference to FIGS. 1-3, the pressing assemblies 26 are coupled to the frame 14 and bias the upper conveyor belt 22 toward the lower conveyor belt 18, as described in further detail below. The pressing assemblies 26 may be engageable with the upper conveyor belt 22 or the lower conveyor belt 18, and some embodiments of the high angle conveyor 10 may include one or more pressing assemblies 26 engageable with the upper conveyor belt 22 and one or more pressing assemblies 26 engageable with the lower conveyor belt 18. Each of the pressing assemblies 26 includes a bracket 86 pivotally coupled to the frame 14. The bracket 86 includes an A-frame 90 and a roller support 94. In the illustrated embodiment, the A-frame 90 is pivotally coupled to the frame 14 and the roller support 94 is pivotally coupled to the A-frame 90 at a pivot joint 95 (FIG. 2). The roller support 94 rotatably supports pressing rollers 98 that engage the upper conveyor belt 22. In the illustrated embodiment, the pressing rollers 98 are arranged in two rows (FIG. 2), with four pressing rollers 98 in each row (FIG. 3). Specifically, the roller support 94 includes linkages 102 that rotatably support the pressing rollers 98.

Each of the pressing assemblies 26 further includes a spring support 106 coupled to the frame 14. A spring 130 is included in each of the pressing assemblies 26 and is positioned between the bracket 86 and the frame 14. In the illustrated embodiment, the spring 130 is positioned between the bracket 86 and the spring support 106. The spring 130 urges the bracket 86 and the pressing rollers 98 toward the upper conveyor belt 22 (i.e., toward the upper conveying belt portion 70 and away from the spring support 106) such that the pressing assembly 26 biases the upper conveyor belt 22 toward the lower conveyor belt 18, securing the material 30 therebetween.

Further details regarding the structure and operation of an exemplary high angle conveyor can be found in U.S. Pat. No. 4,609,097 to Continental Conveyor and Equipment Company, Inc., and in U.S. Pat. No. 9,884,729, to Joy M M Delaware, Inc., the entire contents of which are hereby incorporated by reference.

Figure 4:
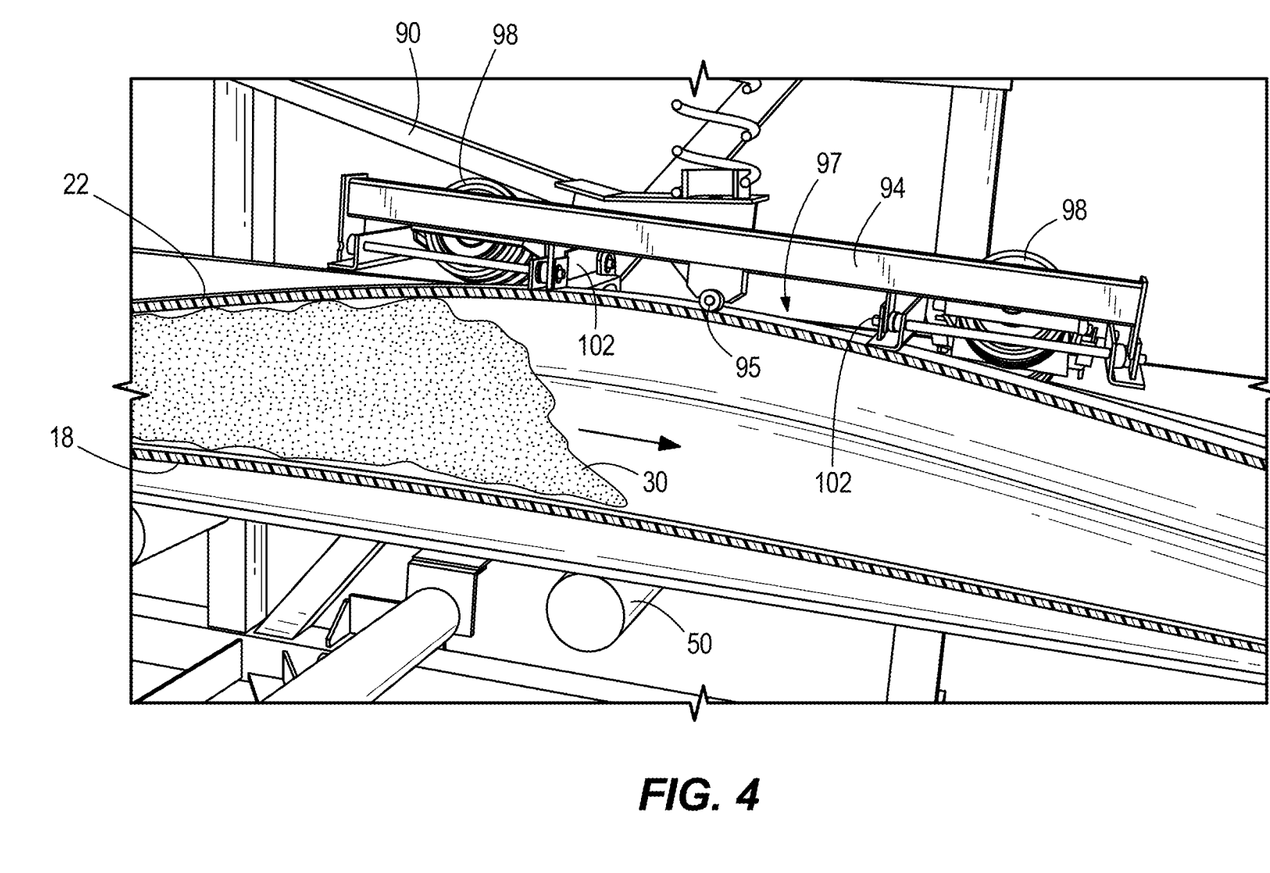
FIG. 4 is a cross-sectional view of a portion of one of the pressing assemblies of FIG. 1 encountering a large lump of material.

As long as high angle conveyors operate within the manufacturer's specified capabilities, high angle conveyors functions properly and according to design. However, problems operating high angle conveyors may arise when the high angle conveyor is loaded beyond its designed capacity (i.e., outside the specified capabilities). For example, in some instances a large object that exceeds the maximum lump size limits is placed between the upper and lower conveyor belts 18, 22. For example, as illustrated in FIG. 4, when a large amount of material 30 or large object is positioned between the conveyor belts 18, 22 and passes underneath the pressing assemblies 26, the upper conveyor belt 22 may be displaced upward into an area 97 of each pressing assembly 26 between the linkages 102 of the roller support 94. As such, the upper conveyor belt 22 may slide against relatively sharp edges on the linkages 102 or the pivot joint 95. This may cause wear on the upper conveyor belt 22, which may lead to tears or other accelerated failures of the upper conveyor belt 22. This problem of the upper conveyor belt 22 contacting portions of the pressing assemblies 26 beyond the rollers 98 would not have been an obvious problem to those skilled in the art because under normal operating conditions, the upper conveyor belt 22 is not significantly deformed. As such, this problem is being raised for the first time herein along with various embodiments of the disclosure to solve the problem.

Figure 5:
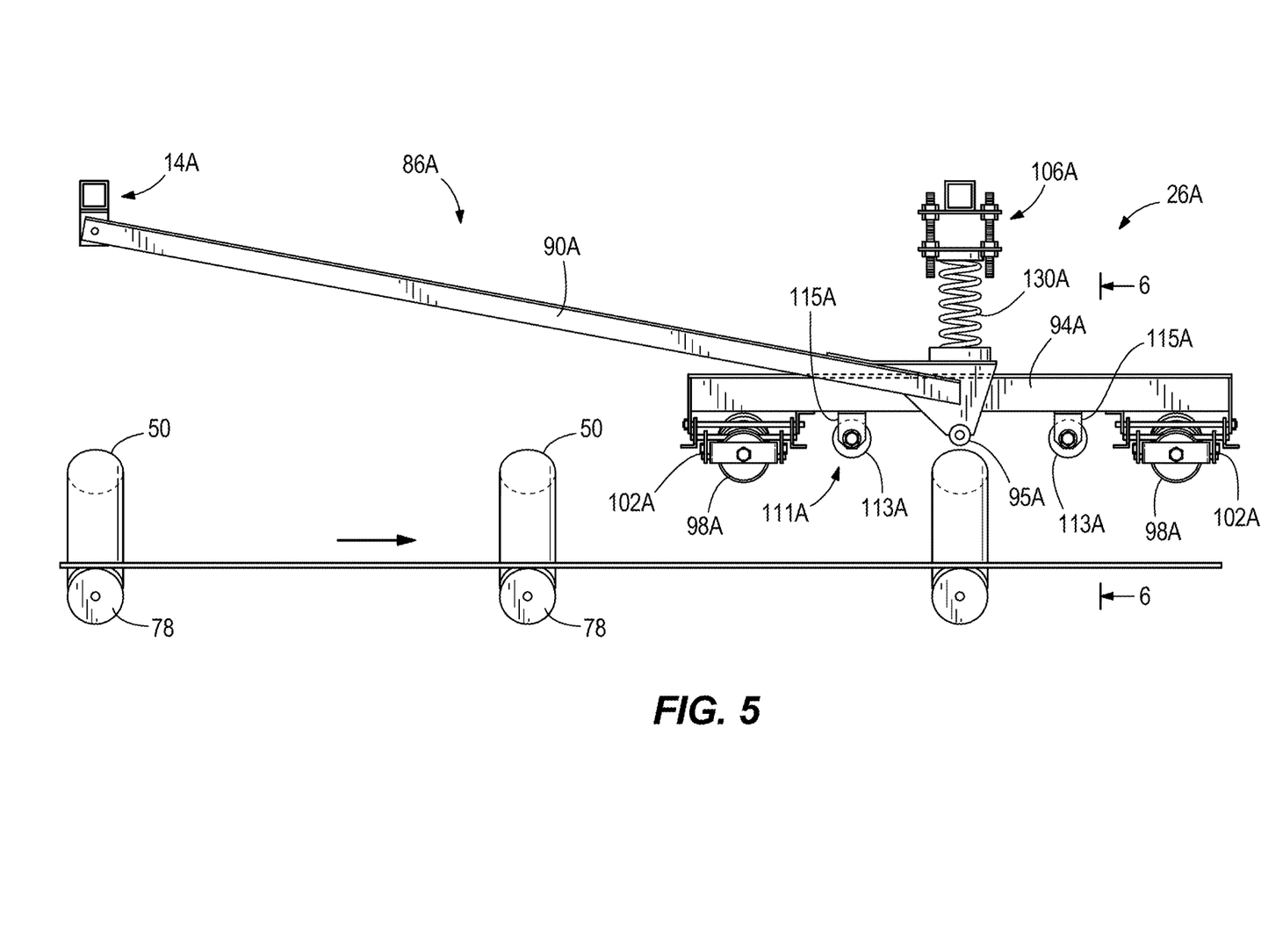
FIG. 5 is a side schematic view of a pressing assembly according to one embodiment of the disclosure and usable with the high angle conveyor of FIG. 1.
Figure 6:
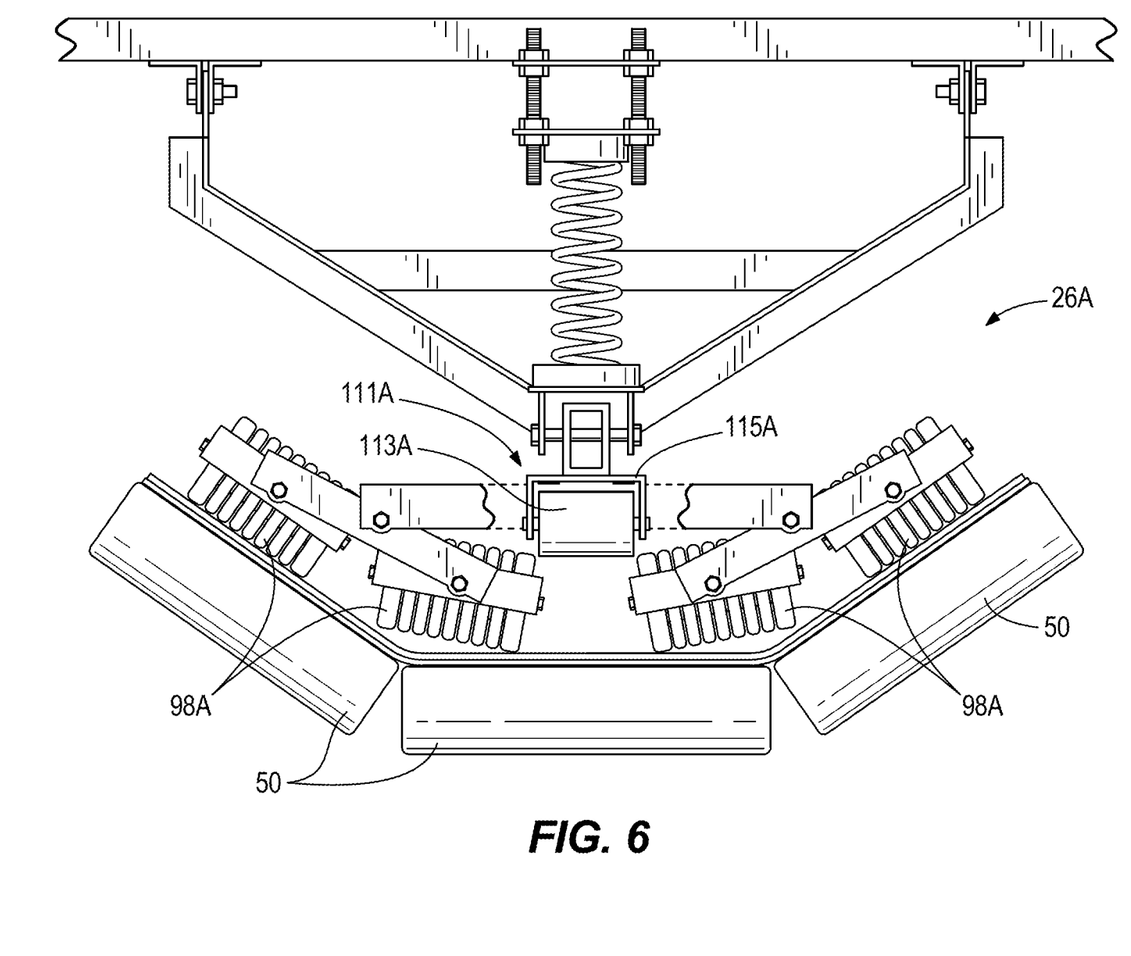
FIG. 6 is a cross-sectional view of the pressing assembly of FIG. 5, taken along arrow 6 in FIG. 5.

FIGS. 5 and 6 illustrate a pressing assembly 26A according to one embodiment of the disclosure. The pressing assembly 26A can be included as part of a high angle conveyor, such as the high angle conveyor 10 described above with reference to FIGS. 1-4, and may be one of a plurality of pressing assemblies 26A. The pressing assembly 26A is similar in some aspects to the pressing assemblies 26 described above, and features and elements of the pressing assembly 26A corresponding with features and elements of the pressing assemblies 26 are given like reference numbers followed by the letter "A."

Referring to FIG. 5, the illustrated pressing assembly 26A includes a bracket 86A pivotally coupled to a frame 14A. The bracket 86A includes an A-frame 90A pivotally coupled to the frame 14A and a roller support 94A pivotally coupled to the A-frame 90A at a pivot joint 95A. The roller support 94A includes linkages 102A that rotatably support pressing rollers 98A. The pressing rollers 98A are configured to engage a first conveyor belt (e.g., the upper conveyor belt 22). A spring 130A extends between the roller support 94A and a spring support 106A coupled to the frame 14A and urges the bracket 86A and the pressing rollers 98A toward the upper conveyor belt 22.

The pressing assembly 26A further includes deflector 111A positioned between the pressing rollers 98A in the belt travel direction. The deflector 111A is engageable with the upper conveyor belt 22 in the event of a large amount of material 30 or a large object passing underneath the pressing assembly 26A. In particular, the deflector 111A is configured to inhibit the upper conveyor belt 22 from snagging or tearing on the linkages 102A and/or the pivot joint 95A. In the illustrated embodiment, the deflector 111A includes deflector rollers (or simply "rollers") 113A rotatably supported by deflector mounts (or simply "mounts") 115A that extend downward from an underside of the roller support 94A. In the illustrated embodiment, the deflector 111A includes two rollers 113A and two corresponding mounts 115A, which are positioned on opposite sides of the pivot joint 95A with respect to the belt travel direction. Illustrated in FIG. 6, the rollers 113A are centered in a lateral direction of the pressing assembly 26A (i.e. in a direction perpendicular to the belt travel direction). In other embodiments, the deflector 111A may include only a single roller 113A, or may include three or more rollers 113A arranged in any manner suitable for inhibiting contact between the linkages 102A, the pivot joint 95A, and the upper conveyor 22.

During ordinary operation, the deflector 111A remains spaced from the upper conveyor belt 22 as the belt 22 travels under the pressing assembly 26A. However, in the event that a sufficiently large lump of material 30 is being transported (FIG. 4), the upper conveyor belt 22 may deflect upward and engage the rollers 113A (FIG. 5), which inhibit the belt 22 from contacting the linkages 102A or the pivot pin 95A. The rollers 113A also provide low friction contact with the belt 22, which minimizes wear on the belt 22.

Figure 7:
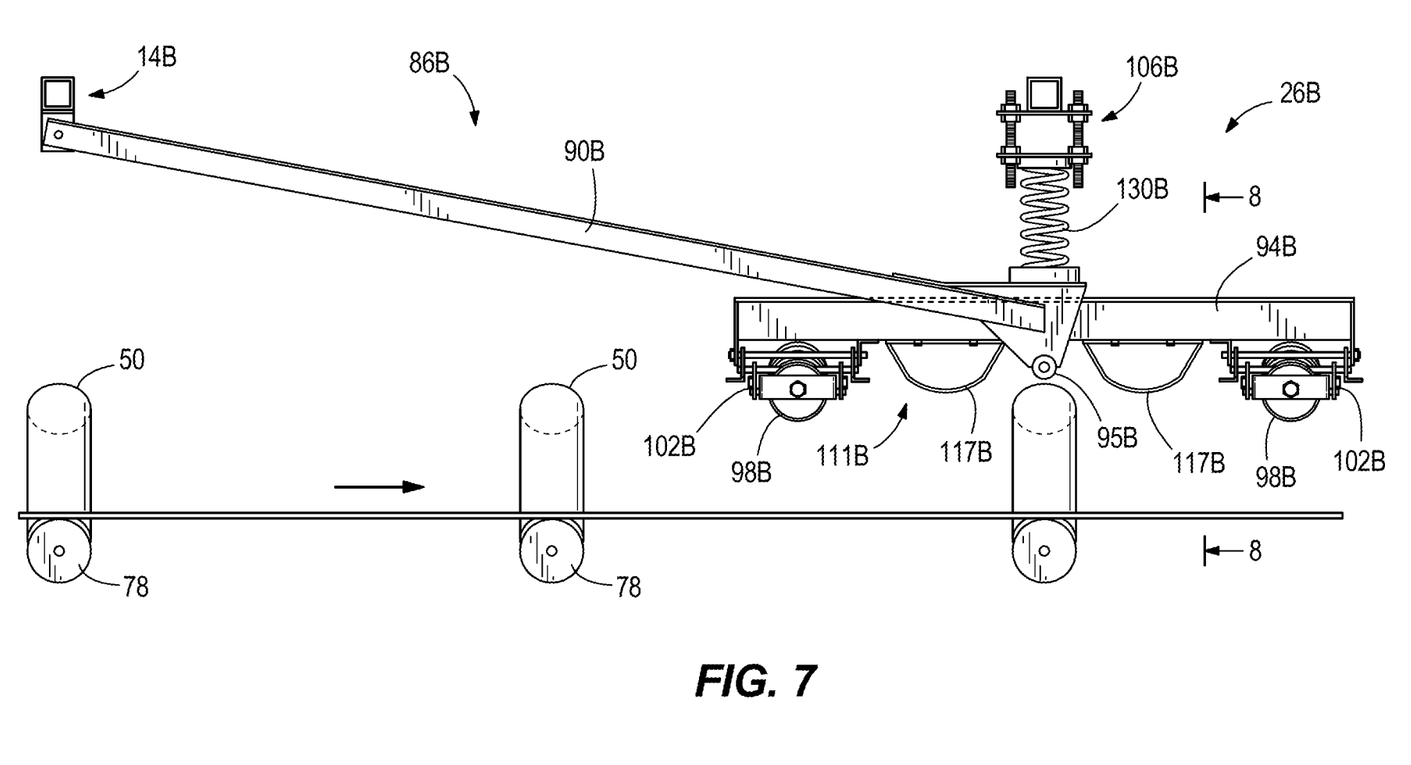
FIG. 7 is a side schematic view of a pressing assembly according to one embodiment of the disclosure and usable with the high angle conveyor of FIG. 1.
Figure 8:
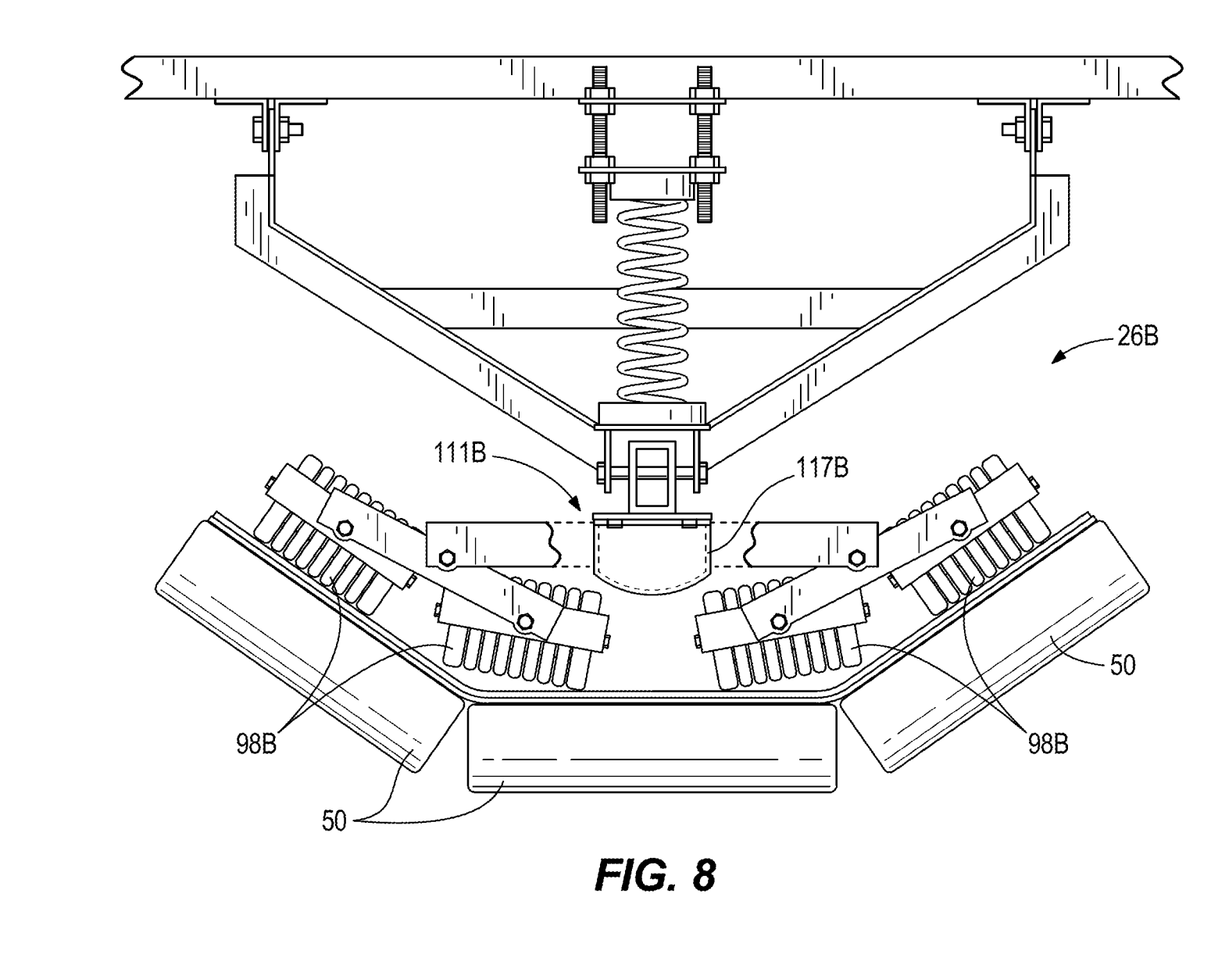
FIG. 8 is a cross-sectional view of the pressing assembly of FIG. 7, taken along arrow 8 in FIG. 7.

FIGS. 7 and 8 illustrate a pressing assembly 26B according to another embodiment of the disclosure. The pressing assembly 26B can be included as part of a high angle conveyor, such as the high angle conveyor 10 described above with reference to FIGS. 1-4, and may be one of a plurality of pressing assemblies 26B. The pressing assembly 26B is similar to the pressing assembly 26A described above with reference to FIGS. 5 and 6, and the following description focuses on differences between the pressing assembly 26B and the pressing assembly 26A for the sake of brevity. In addition, features and elements of the pressing assembly 26B corresponding with features and elements of the pressing assembly 26A are given like reference numbers followed by the letter "B."

Referring to FIG. 7, the illustrated deflector 111B includes two curved plates 117B, which are positioned on opposite sides of the pivot joint 95B with respect to the belt travel direction. The plates 117B may be made of metal (e.g., steel) and may be secured to the underside of the roller support 94B by welding, fasteners, or any other suitable means. In other embodiments, the plates 117B may be made of a low friction material, such as ultra-high molecular weight polyethylene.

Illustrated in FIG. 8, the plates 117B are centered in a lateral direction of the pressing assembly 26B (i.e. in a direction perpendicular to the belt travel direction). In other embodiments, the deflector 111B may include only a single plate 117B, or may include three or more plates 117B arranged in any manner suitable for inhibiting contact between the linkages 102B, the pivot joint 95B, and the upper conveyor belt 22.

During ordinary operation, the deflector 111B remains spaced from the upper conveyor belt 22 as the belt 22 travels under the pressing assembly 26B. However, in the event that a sufficiently large lump of material 30 is being transported (FIG. 4), the upper conveyor belt 22 may deflect upward and engage the plates 117B (FIG. 7), which inhibit the belt 22 from contacting the linkages 102B or the pivot joint 95B. The curvature of the plates 117B provides for generally tangential contact between the plates 117B and the upper conveyor belt 22, which minimizes friction and wear on the belt 22.

Figure 9:
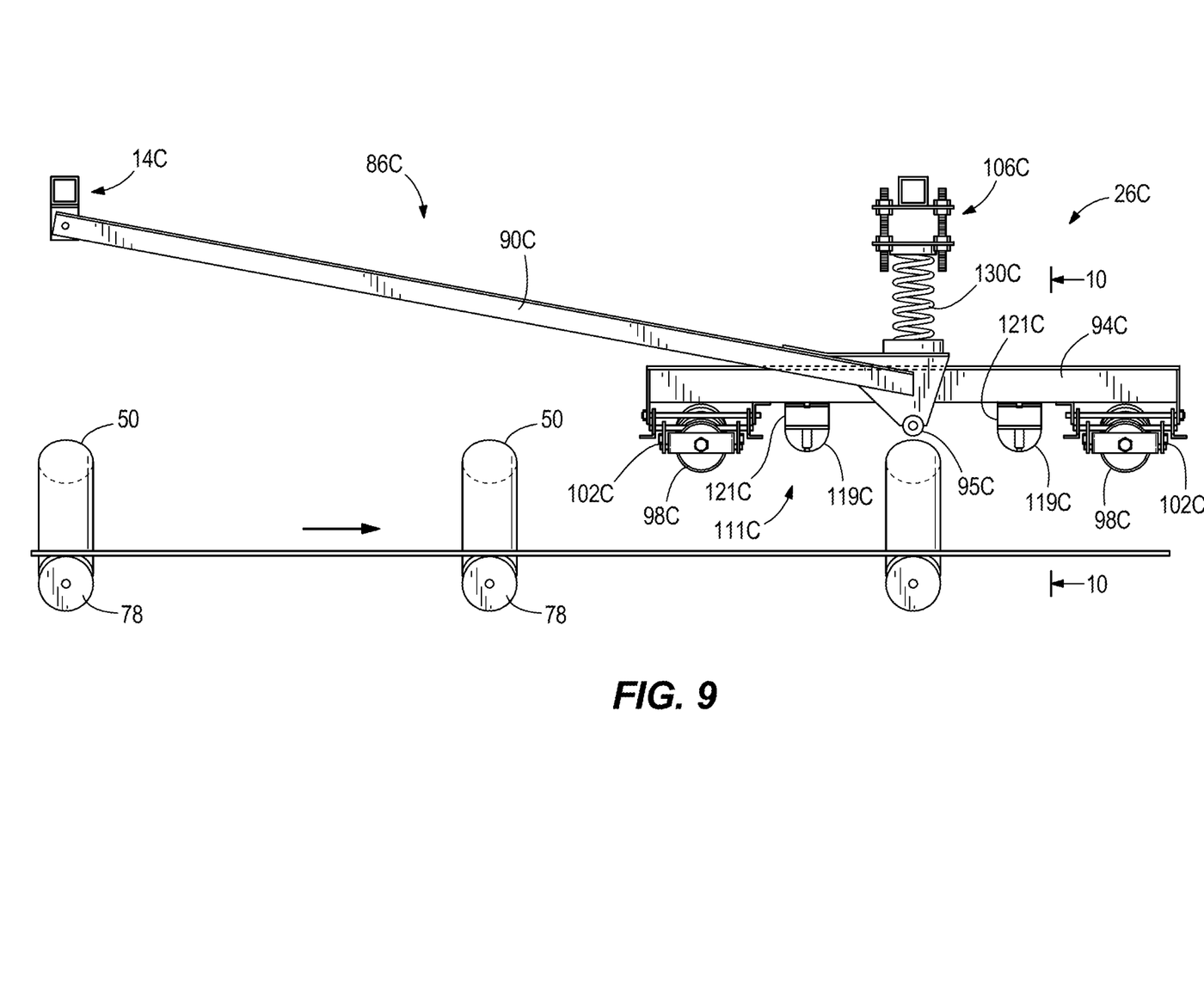
FIG. 9 is a side schematic view of a pressing assembly according to one embodiment of the disclosure and usable with the high angle conveyor of FIG. 1.
Figure 10:
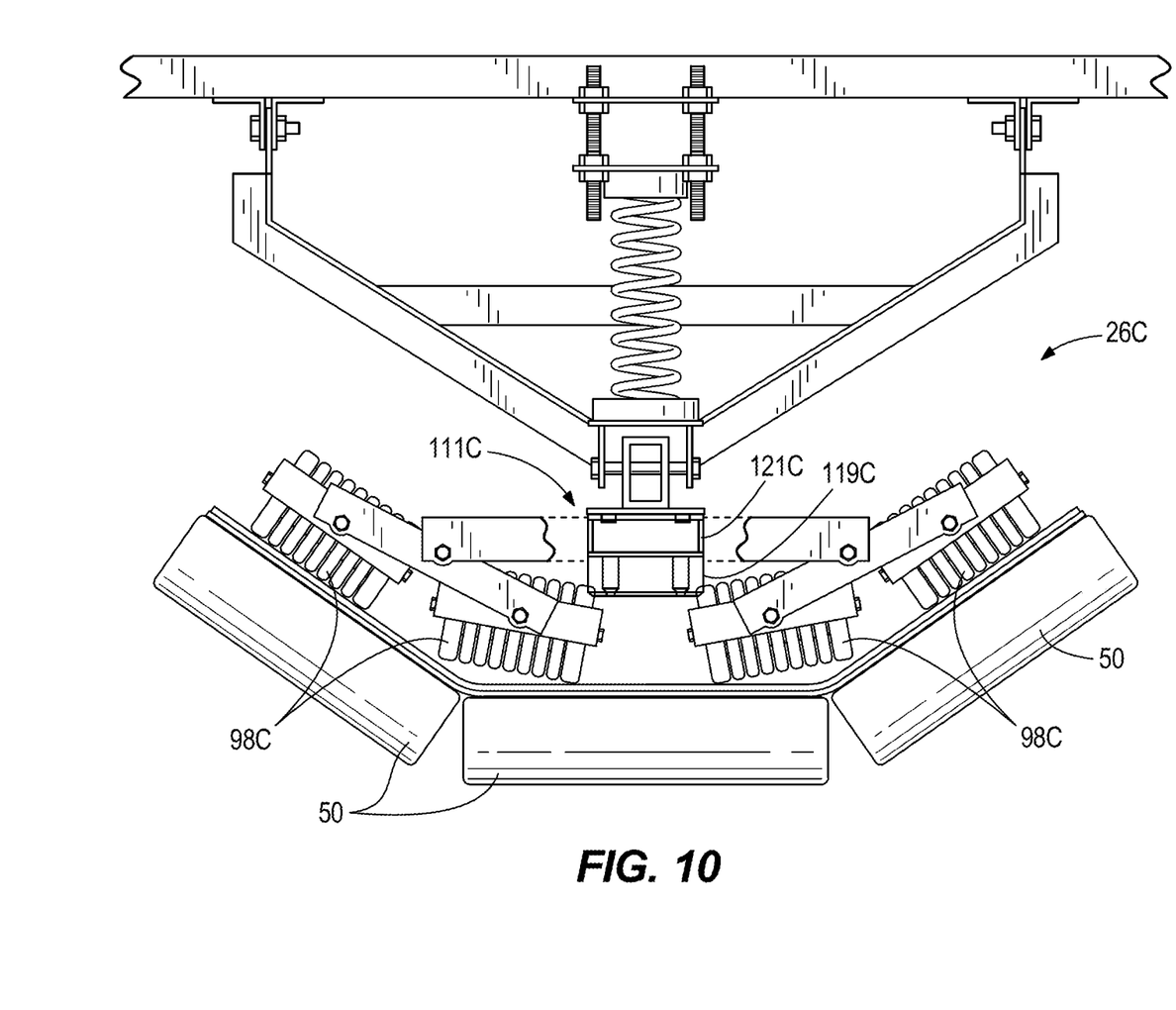
FIG. 10 is a cross-sectional view of the pressing assembly of FIG. 9, taken along arrow 10 in FIG. 9.

FIGS. 9 and 10 illustrate a pressing assembly 26C according to another embodiment of the disclosure. The pressing assembly 26C can be included as part of a high angle conveyor, such as the high angle conveyor 10 described above with reference to FIGS. 1-4, and may be one of a plurality of pressing assemblies 26C. The pressing assembly 26C is similar to the pressing assembly 26B described above with reference to FIGS. 7 and 8, and the following description focuses on differences between the pressing assembly 26C and the pressing assembly 26B for the sake of brevity. In addition, features and elements of the pressing assembly 26C corresponding with features and elements of the pressing assembly 26B are given like reference numbers followed by the letter "C."

Referring to FIG. 9, the illustrated deflector 111C includes two curved sliding blocks 119C affixed to corresponding mounts 121C that are positioned on opposite sides of the pivot joint 95C with respect to the belt travel direction. The blocks 119C are preferably made of a low friction material, such as ultra-high molecular weight polyethylene. In other embodiments, the blocks 119C may be made of metal. The blocks 119C may be affixed to the mounts 121C by one or more fasteners extending through the respective blocks 119C. The blocks 119C may be removable from the mounts 121C to facilitate replacement. The mounts 121C are preferably made of metal and welded to the underside of the roller support 94C. Alternatively, the mounts 121C may be made of other materials and secured to the underside of the roller support 94C in any other suitable manner.

Illustrated in FIG. 10, the mounts 121C and blocks 119C are centered in a lateral direction of the pressing assembly 26C (i.e. in a direction perpendicular to the belt travel direction). In other embodiments, the deflector 111C may include only a single block 119C, or may include three or more blocks 119C arranged in any manner suitable for inhibiting contact between the linkages 102C, the pivot joint 95C, and the upper conveyor belt 22.

During ordinary operation, the deflector 111C remains spaced from the upper conveyor belt 22 as the belt 22 travels under the pressing assembly 26C. However, in the event that a sufficiently large lump of material 30 is being transported (FIG. 4), the upper conveyor belt 22 may deflect upward and engage the blocks 119C (FIG. 8), which inhibit the belt 22 from contacting the linkages 102C or the pivot joint 95C. The curvature of the blocks 119C provides for generally tangential contact between the blocks 119C and the upper conveyor belt 22. This shape, along with the low friction material of the blocks 119C, minimizes friction and wear on the belt 22.

Figure 11:
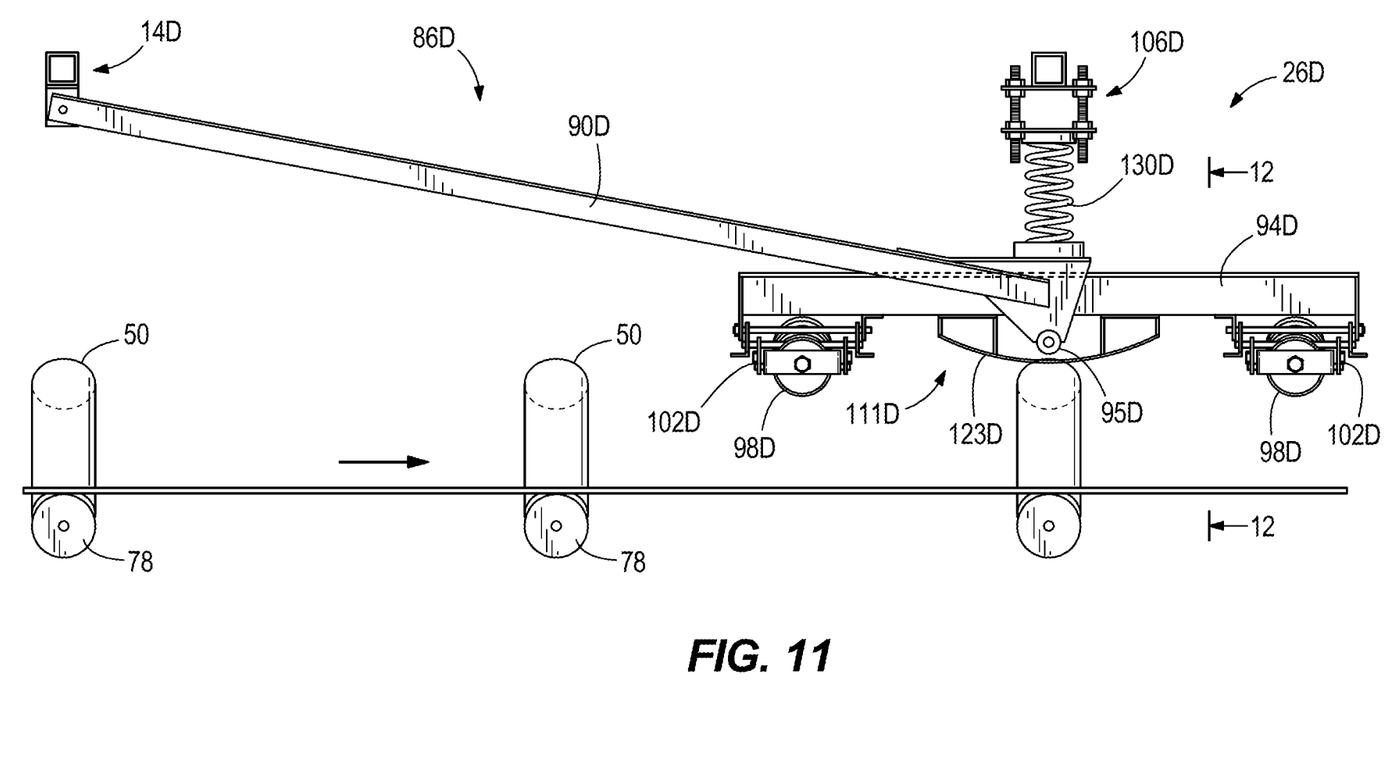
FIG. 11 is a side schematic view of a pressing assembly according to one embodiment of the disclosure and usable with the high angle conveyor of FIG. 1.
Figure 12:
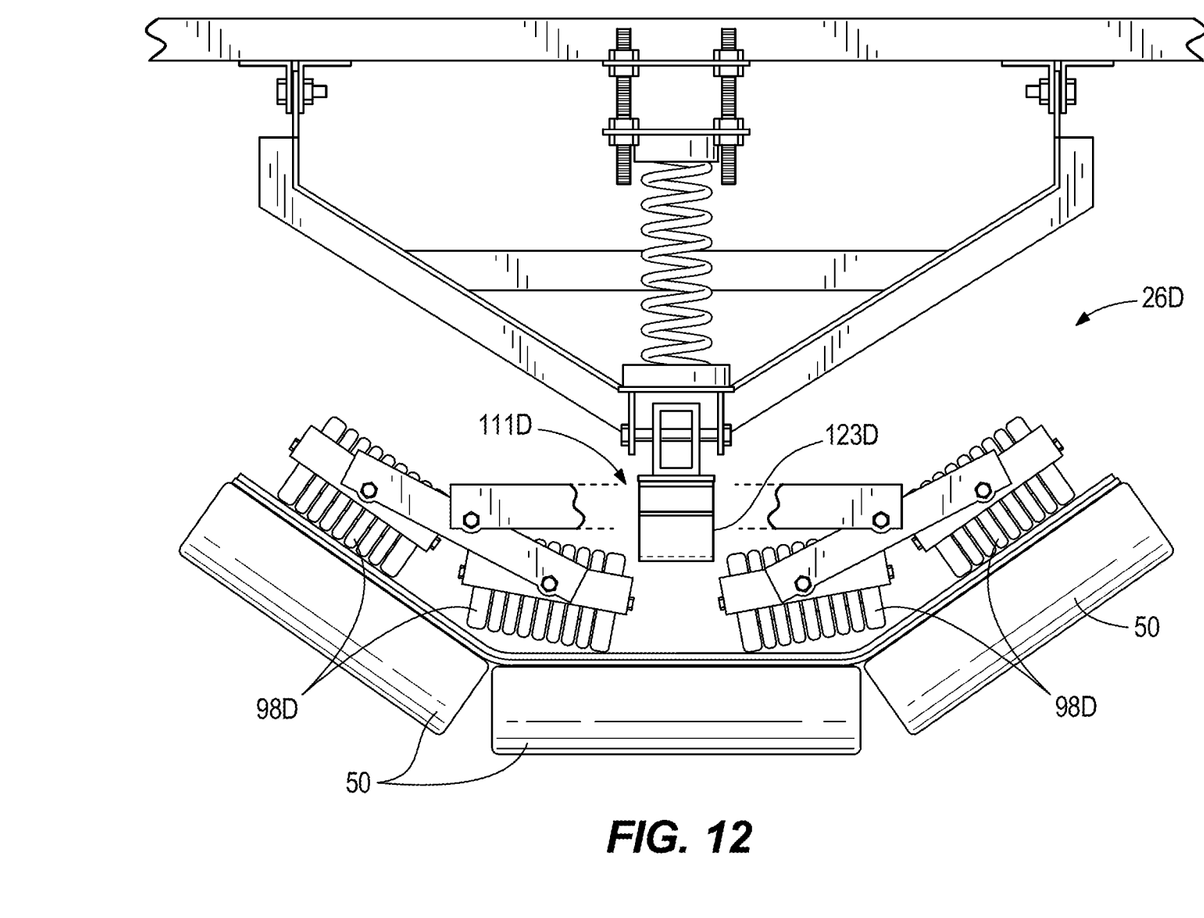
FIG. 12 is a cross-sectional view of the pressing assembly of FIG. 11, taken along arrow 12 in FIG. 11.

FIGS. 11 and 12 illustrate a pressing assembly 26D according to another embodiment of the disclosure. The pressing assembly 26D can be included as part of a high angle conveyor, such as the high angle conveyor 10 described above with reference to FIGS. 1-4, and may be one of a plurality of pressing assemblies 26D. The pressing assembly 26D is similar to the pressing assembly 26C described above with reference to FIGS. 9 and 10, and the following description focuses on differences between the pressing assembly 26D and the pressing assembly 26C for the sake of brevity. In addition, features and elements of the pressing assembly 26D corresponding with features and elements of the pressing assembly 26C are given like reference numbers followed by the letter "D."

Referring to FIG. 11, the illustrated deflector 111D includes a single curved plates 123D, which at least partially surrounds the pivot joint 95D in the belt travel direction. The plates 123D may be made of metal (e.g., steel) and may be secured to the underside of the roller support 94D by welding, fasteners, or any other suitable means. In other embodiments, the plate 123D may be made of a low friction material, such as ultra-high molecular weight polyethylene.

Illustrated in FIG. 12, the plate 123D is centered both in a lateral direction of the pressing assembly 26D (i.e. in a direction perpendicular to the belt travel direction) and in the belt travel direction. In other embodiments, the deflector 111D may include two or more plates 123D arranged in any manner suitable for inhibiting contact between the linkages 102D, the pivot joint 95D, and the upper conveyor belt 22.

During ordinary operation, the deflector 111D remains spaced from the upper conveyor belt 22 as the belt 22 travels under the pressing assembly 26D. However, in the event that a sufficiently large lump of material 30 is being transported (FIG. 4), the upper conveyor belt 22 may deflect upward and engage the plate 123D (FIG. 11), which inhibits the belt 22 from contacting the linkages 102D or the pivot joint 95D. The curvature of the plate 123D provides for generally tangential contact between the plate 123D and the upper conveyor belt 22, which minimizes friction and wear on the belt 22.

Various features of the invention are set forth in the following claims.

What is claimed is:

1. A pressing assembly for a conveyor having a first conveyor belt and a second conveyor belt, the pressing assembly comprising:
   a roller support;
   a linkage coupled to the roller support;
   a roller rotatably coupled to the linkage, the roller configured to engage the first conveyor belt to press the first conveyor belt toward the second conveyor belt; and
   a deflector engageable with the first conveyor belt to inhibit contact between the first conveyor belt and the linkage.

2. The pressing assembly of claim 1, wherein the deflector includes a curved plate coupled to the roller support.

3. The pressing assembly of claim 2, wherein the curved plate is made of metal.

4. The pressing assembly of claim 2, wherein the curved plate is made of ultra-high molecular weight polyethylene.

5. The pressing assembly of claim 1, wherein the deflector includes a deflector roller.

6. The pressing assembly of claim 1, wherein the first conveyor is slidable along the deflector to inhibit contact between the first conveyor belt and the linkage.

7. The pressing assembly of claim 1, wherein the deflector is made of a low friction material.

8. The pressing assembly of claim 1, wherein the deflector is removably coupled to the roller support.

9. The pressing assembly of claim 1, wherein the roller is one of a plurality of rollers, wherein the linkage is one of a plurality of linkages rotatably supporting the plurality of rollers, and wherein the deflector is configured to inhibit contact between the first conveyor belt and each of the plurality of linkages.

10. The pressing assembly of claim 1, further comprising a spring configured to bias the roller into engagement with the first conveyor belt.

11. The pressing assembly of claim 1, wherein the deflector includes a plurality of sliding blocks made of a low friction material.

12. The pressing assembly of claim 1, wherein the deflector is configured to engage the first conveyor belt in response to a lump of material being conveyed past the pressing assembly.

13. The pressing assembly of claim 1, wherein the roller support includes a pivot joint, and wherein the deflector is positioned between the pivot joint and the linkage.

14. A conveyor comprising:
   a frame;
   a first conveyor belt;
   a second conveyor belt; and
   a pressing assembly configured to press the first conveyor belt toward the second conveyor belt, the pressing assembly including
      a bracket pivotally coupled to the frame,
      a roller support pivotally coupled to the bracket at a pivot joint,
      a linkage coupled to the roller support,
      a roller rotatably coupled to the linkage, the roller configured to engage the first conveyor belt, and
      a deflector configured to inhibit the first conveyor belt from contacting the linkage and the pivot joint when a lump of material is conveyed past the pressing assembly.

15. The conveyor of claim 14, wherein the deflector is positioned between the pivot joint and the linkage.

16. The conveyor of claim 14, wherein the deflector includes a plurality of sliding blocks made of low friction material.

17. The conveyor of claim 14, wherein the deflector includes a roller.

18. The conveyor of claim 14, further comprising a spring extending between the bracket and the frame.

19. The conveyor of claim 18, wherein the spring is configured to bias the roller into engagement with the first conveyor belt.

20. A conveyor comprising:
   a frame;
   a first conveyor belt;
   a second conveyor belt; and
   a pressing assembly configured to press the first conveyor belt toward the second conveyor belt, the pressing assembly including
      a bracket pivotally coupled to the frame,
      a roller support pivotally coupled to the bracket at a pivot joint,
      a linkage coupled to the roller support,
      a roller rotatably coupled to the linkage, the roller configured to engage the first conveyor belt, and
      a deflector engageable with the first conveyor belt to inhibit the first conveyor from contacting the linkage or the pivot joint.

* * * * *